United States Patent
Li et al.

(10) Patent No.: US 9,916,914 B2
(45) Date of Patent: Mar. 13, 2018

(54) N-DOPED CARBON MATERIALS

(75) Inventors: Zhi Li, Edmonton (CA); Li Zhang, Edmonton (CA); Chris M. B. Holt, Edmonton (CA); David Mitlin, Edmonton (CA)

(73) Assignee: The Governors of the University of Alberta, Edmonton (CA)

( * ) Notice: Subject to any disclaimer, the term of this patent is extended or adjusted under 35 U.S.C. 154(b) by 539 days.

(21) Appl. No.: 14/343,551

(22) PCT Filed: Sep. 7, 2012

(86) PCT No.: PCT/CA2012/050623
§ 371 (c)(1),
(2), (4) Date: Jun. 10, 2014

(87) PCT Pub. No.: WO2013/033847
PCT Pub. Date: Mar. 14, 2013

(65) Prior Publication Data
US 2014/0291587 A1    Oct. 2, 2014

Related U.S. Application Data

(60) Provisional application No. 61/531,731, filed on Sep. 7, 2011.

(51) Int. Cl.
*C01B 32/00* (2017.01)
*H01B 1/04* (2006.01)
(Continued)

(52) U.S. Cl.
CPC .............. *H01B 1/04* (2013.01); *C01B 32/00* (2017.08); *C01B 32/05* (2017.08); *C01B 32/30* (2017.08);
(Continued)

(58) Field of Classification Search
CPC .......... H01B 1/04; C01B 31/00; C01B 31/02; C01B 31/08; C01B 31/081; H01G 11/34;
(Continued)

(56) References Cited

U.S. PATENT DOCUMENTS

| | | | | |
|---|---|---|---|---|
| 5,242,879 A | * | 9/1993 | Abe ...................... | B01J 20/20 210/756 |
| 5,338,462 A | * | 8/1994 | Abe ...................... | B01J 20/20 210/757 |
| 2009/0305883 A1 | | 12/2009 | Rayalu et al. | |

FOREIGN PATENT DOCUMENTS

| | | |
|---|---|---|
| CA | 2057184 | 6/1992 |
| WO | 92/04414 | 3/1992 |

OTHER PUBLICATIONS

Nakano et al. "Chemical Composition of Chicken Eggshell and Shell Membranes". 2003 Polutry Science Association. Nov. 18, 2002. 5 Total Pages.*

(Continued)

*Primary Examiner* — Harold Pyon
*Assistant Examiner* — Danny N Kang
(74) *Attorney, Agent, or Firm* — Murtha Cullina LLP

(57) ABSTRACT

A carbon material comprising pyrolized egg protein characterized by containing mesopores or micropores. The pyrolized egg protein may comprise pyrolyzed eggshell membrane having a continuous conducting core and a porous shell, the pyrolyzed eggshell membrane comprising partially-activated carbon. The porous shell may comprise nitrogen or oxygen. The pyrolized egg protein may comprise mesoporous egg white.

16 Claims, 6 Drawing Sheets

(51) Int. Cl.
| | |
|---|---|
| *H01G 11/34* | (2013.01) |
| *C01B 32/05* | (2017.01) |
| *C01B 32/30* | (2017.01) |
| *C01B 32/324* | (2017.01) |
| *H01M 4/583* | (2010.01) |
| *H01M 4/96* | (2006.01) |
| *H01M 4/587* | (2010.01) |
| *H01M 4/62* | (2006.01) |
| *H01M 8/0213* | (2016.01) |
| *H01M 8/0234* | (2016.01) |

(52) U.S. Cl.
CPC ............ *C01B 32/324* (2017.08); *H01G 11/34* (2013.01); *H01M 4/583* (2013.01); *H01M 4/587* (2013.01); *H01M 4/625* (2013.01); *H01M 4/96* (2013.01); *H01M 8/0213* (2013.01); *H01M 8/0234* (2013.01); *Y02E 60/13* (2013.01)

(58) Field of Classification Search
CPC ...... H01M 4/583; H01M 4/587; H01M 4/625; H01M 4/96; H01M 8/0213; H01M 8/0234; Y02E 60/13
USPC ........................................................ 252/500
See application file for complete search history.

(56) References Cited

OTHER PUBLICATIONS

Lin et al. "Transformed In Situ Fabrication of Macroporous Carbon Network Structures From Egg MEmbranes and Its Biomacromolecule Adsorption". Polymer Composites. 2011. Wiley Online Library. Total pp. 7.*

Dong Yang et al: Eggshell Membrane Templating of Hierarchically Ordered Macroporous Networks Composed of TiO2 Tubes; Adv Matter, 2002, 14, No. 21, Nov. 4, 2002; p. 1543-1546.

Maria Christy et al.: Lithium Insertion Behavior of Nanoscopic CO3O4 Prepared With Avian Egg Membrane as a Template; Bull. Korean Chem.Soc, 2011, vol. 32, No. 4; p. 1204-1208.

Zhi Li et al: Carbonized Chicken Eggshell Membranes With 3D Architectures as High-Performance Electrode Materials for Supercapacitors; Adv. Energy Mater. 2012; 2; p. 431-437.

Lin Lin et al.: Transformed In Situ Fabrication of Macroporous Carbon Network Structures From Egg Membranes and Its Biomacromolecule Adsorption; Polymer Composites, 2011, p. 1062-1068.

Rachel Ribeiro Vieira Azzi Rios et al.: Tailoring Activated Carbon by Surface Chemical Modification With O, S, and N Containing Molecules; Materials Research, vol. 6, No. 2, p. 129-135, 2003.

Patent Cooperation Treaty; International Search Report for PCT/CA2012/050623; Dec. 3, 2012; p. 1-4.

* cited by examiner

N-DOPED CARBON MATERIALS

CROSS-REFERENCE TO RELATED APPLICATIONS

This application claims the benefit under 35 USC 119(e) of U.S. provisional application Ser. No. 61/531,731 filed Sep. 7, 2011 the entire disclosure of which is herein incorporated by reference.

TECHNICAL FIELD

Carbon materials.

BACKGROUND

Nitrogen-rich carbon materials are very useful for applications such as supercapacitors, battery electrodes, oxygen reduction reaction supports for polymer electrolyte membrane (PEM) fuel cells and direct methanol fuel cells, and as sorbents for CO2 capture. They are also very useful as supports for other "active" materials such as Fe3O4, which yields synergistic CO2 capture and heavy metal absorption performance. Unfortunately nitrogen-rich carbonized materials are expensive to manufacture, normally requiring intense chemical treatments, such as acid boiling or exposure to high temperature ammonia vapors, in order to make their surfaces rich in nitrogen atoms. Moreover since these atoms are only at the outermost surface layer, the nitrogen-induced functionality wears out with prolonged use. Ideally the high (near 10% by weight) content would be in the bulk of the carbonaceous material, rather than at the surface. This would require high nitrogen content in the feedstock. A major economic advantage of such feedstock is that it would not require additional chemical treatments but would rely simply on pyrolysis and activation. Many such materials come from esoteric sources such as certain forms of seaweed.

Others have soaked eggshell membrane (ESM) in Co(NO3)2.6H2O and have pyrolyzed the whole structure. Also, ESM is often used as a template for other structures and is removed during pyrolysis.

SUMMARY

In an embodiment, there is disclosed a carbon material comprising pyrolyzed egg protein characterized by containing mesopores or micropores. The pyrolyzed egg protein may comprise pyrolyzed eggshell membrane having a continuous conducting core and a porous shell, the pyrolyzed eggshell membrane comprising partially-activated carbon. The porous shell may comprise nitrogen or oxygen. The pyrolyzed egg protein may comprise mesoporous egg white. The carbon material may be functionalized by addition of elemental materials, alloys, oxides, nitrides, sulfides, hydrides, or hydroxides.

In an embodiment, a method of forming a capacitive material is disclosed comprising pyrolyzing eggshell membrane and partially activating carbon in the eggshell membrane to yield a partially-activated eggshell membrane having a continuous conducting core and a porous shell. The pyrolyzed eggshell membrane may be functionalized. The porous shell may comprise nitrogen or oxygen.

In an embodiment, there is disclosed a capacitive material, comprising pyrolyzed eggshell membrane having a continuous conducting core and a porous shell, the pyrolyzed eggshell membrane comprising partially-activated carbon. The porous shell may comprise nitrogen or oxygen. The carbon material may be functionalized by addition of elemental materials, alloys, oxides, nitrides, sulfides, hydrides, or hydroxides.

In an embodiment, there is disclosed a method of forming a carbon material, comprising adsorbing proteins onto a porous template and pyrolizing the proteins on the porous template to form activated carbon. The proteins may comprise egg white proteins. The porous template may be mesoporous. The method may comprise removing the porous template after pyrolizing. The method may comprise functionalizing the activated carbon. The activated carbon may contain nitrogen.

BRIEF DESCRIPTION OF THE FIGURES

Embodiments will now be described with reference to the figures, in which like reference characters denote like elements, by way of example, and in which.

DETAILED DESCRIPTION

Figure 1:
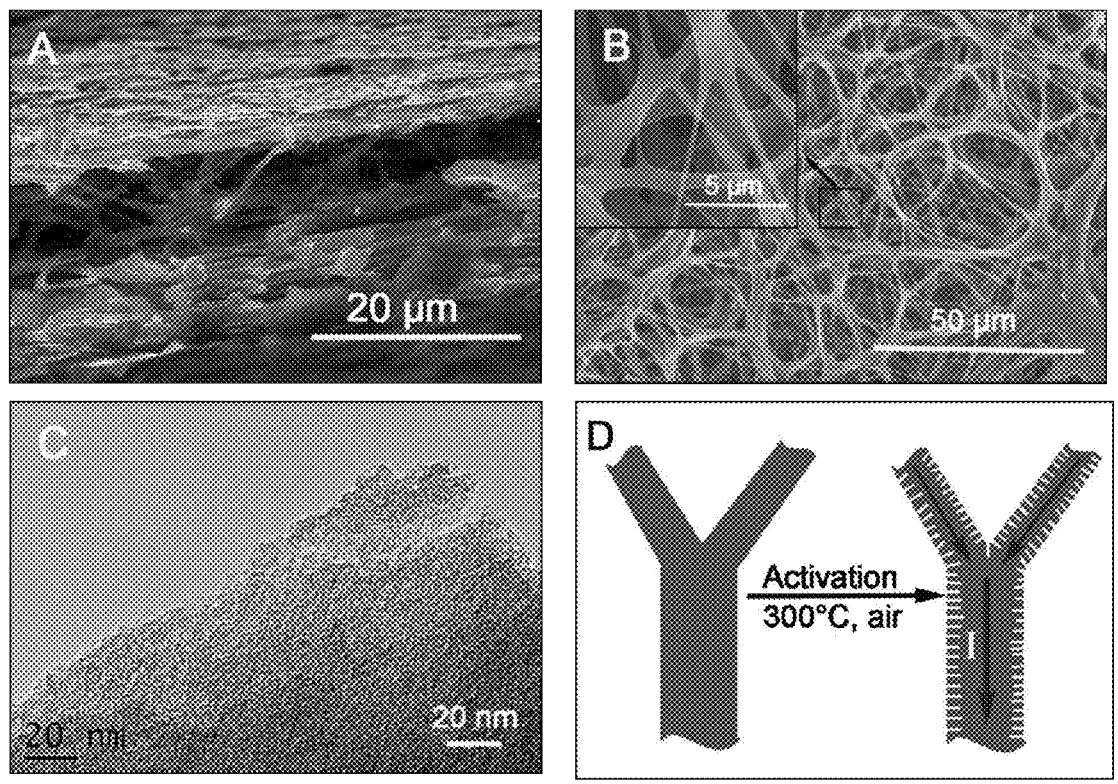
FIG. 1 shows SEM images of activated CESM in cross-section view (A) and plan view (B), the inset of (B) is the high resolution image of the selected area; (C) TEM image of activated CESM; (D) Illustration of the carbon-carbon core-shell structure of activated CESM.

In one embodiment, there is disclosed pyrolized egg protein characterized by containing mesopores (average pore size 2 nm-50 nm) and micropores (pore size less than 2 nm) or both. In an embodiment, there is disclosed pyrolized egg protein comprising partially-activated, pyrolyzed (carbonized) eggshell membrane. The partially-activated, pyrolyzed eggshell membrane described herein may be an intact, stand-alone membrane.

There is also disclosed a nitrogen-rich, highly graphitic, fibrous material, in which the shell (outer region) of the fibres is porous but the core is solid, and a method of producing the material from an eggshell membrane.

There is also disclosed a process for converting eggshell membranes and egg whites to value-added nitrogen-rich carbons. Eggshell membranes and egg whites, which are naturally rich in nitrogen, constitute a waste product in many operations such as commercial egg production, for example, eggs that are pre-cracked or did not pass inspection otherwise. In an embodiment, the eggshell membrane is heated up in an inert atmosphere for pyrolysis. After pyrolysis, the eggshell membrane may be cleaned, for example, using KOH and HCl, and is partially activated to increase the surface area (in the outer "shell") and to incorporate oxygen. In the preferred embodiment, the nitrogen content and interconnected fibrous structure of the eggshell membrane remain largely intact after treatment, and the treated eggshell membrane is a capacitive material with a continuous conducting core and a porous shell. The nitrogen-rich (through the bulk) product is suited for supercapacitors, battery electrodes, CO2 capture, oxygen reduction reaction, catalysis, macromolecule sorption, and environmental remediation, such as heavy metal capture, hydrocarbon absorption, and chemical spill sorption. In the case of egg whites, egg white protein may be adsorbed onto a mesoporous or microporous template and pyrolyzed to form activated carbon. The mesoporous or microporous template may then be removed, leaving a stand alone structure, or a structure that may be placed on a support for further use, such as for supercapacitors, battery electrodes, CO2 capture, oxygen reduction reaction, catalysis, macromolecule sorption, and environmental remediation, such as heavy metal capture, hydrocarbon absorption, and chemical spill sorption.

Full activation would excessively decrease the nitrogen content and make the core too porous, leading to poor electrical conductivity as the equivalent series resistance increases and the power density drops. Conversely, partial activation increases the surface area within the outside "shell" of the fibres by removing the amorphous carbon, while retaining the nitrogen atoms and the solid cores of the fibres, both of which are needed for high electrical conductivity. Activation further adds oxygen. Both nitrogen and oxygen contribute to faradaic capacitance and high electrical conductivity. It is believed that what happens during pyrolysis in inert atmosphere is that the organic carbon gets converted into graphitic and amorphous carbon. During activation in oxygen, the amorphous carbon gets burned away so that it is mainly graphitic carbon that remains. Performing all the pyrolysis in oxygen would just burn everything away.

In an alternative embodiment, the eggshell membrane may be partially activated through a single heating schedule instead of separate heating schedules for both pyrolysis and activation. For example, the eggshell membrane could be pyrolyzed in inert atmosphere, with oxygen added at the end for the partial activation. However, it is preferable to bring the temperature back down after pyrolysis and to clean the membrane in KOH and HCl as this gets rid of inorganic impurities, which can affect the electrochemical measurements (e.g., the electrochemical performance in KOH is already greatly stabilized after this cleaning step).

In this patent document is also disclosed a nitrogen-rich, highly graphitic material, in which the shell (outer region) is porous but the core is solid, and a method of producing the material from egg white.

In an embodiment mesoporous carbon derived from egg white (MPEw) is synthesized from egg white using a mesoporous template containing pores with diameters between 2 and 50 nm, or an activation treatment to make the egg white porous. The utility of mesoporous and microporous activated carbon depends for example on the application (super capacitor vs. battery), electrolyte (aqueous vs. polymer) and scan rate. In general small microporosity is useful for aqueous supercapacitor electrolytes and at lower scan rates. At higher scan rates and in polymer electrolytes (almost always the case for LIB batteries) small mesopores are better. Too many large mesopores result in a low surface area, which is generally undesirable, but some large mesopores are useful for electrolyte transfer. Very small micropores (<1 nm or so) tend not to be very useful for most applications since even in aqueous electrolytes they give transport problems at higher scan rates. For use as a supercapacitor or as an electrode in a battery, the structured carbon materials are typically combined with binder and carbon black in conventional manner.

The proteins present in the egg white are adsorbed into the template and subsequently pyrolyzed under inert atmosphere. In an embodiment the pyrolyzed egg white is a capacitive material with a continuous conducting carbon core and a porous shell with nitrogens and oxygen. The nitrogen-rich (through the bulk) product is suited for supercapacitors, battery electrodes, CO2 capture, oxygen reduction reaction, catalysis, macromolecule sorption, and environmental remediation, such as heavy metal capture, hydrocarbon absorption, and chemical spill sorption.

In an alternative embodiment, the pyrolyzed egg white may not be activated.

Other methods to partially activate the pyrolyzed eggshell membrane or pyrolyzed egg white may be used, such as using CO2, CO, or steam, instead of oxygen. Chemical activation techniques may also be used in certain embodiments, and may involve soaking the membrane in acid, base, or salt, and then heating the membrane in a single pyrolysis/activation step.

The pyrolyzed carbon may be functionalized, in respective embodiments, with oxides or hydroxides of elements such as iron (e.g., Fe3O4, Fe2O3, FeOOH), manganese (e.g., MnO2), cobalt (e.g., Co3O4, CoO2), ruthenium, vanadium, or nickel; or with nitrides such as VN or TixV1-xN; or with hydrides such as MgH2; or with sulfur or sulfides such as FeS; or with elemental materials such as platinum (Pt), aluminum (Al), silicon (Si), or tin (Sn), or with alloys of the preceding elements; or with oxides such as cobaltites (e.g., NiCo2O4) and molybdates (e.g, CoMoO4, NiMoO4, FeMoO4, MgMoO4, MnMoO4); or combinations of those materials to further its applicability to applications such as battery electrodes, oxygen reduction reaction supports, and use in supercapacitors and sorbents for the capture of CO2, organic carbon, naphthenic acid and heavy metals. The preceding list is not intended to be limiting, as other materials may also be used for these or other applications.

Oxides may be added to the pyrolized carbon, such as eggshell membrane or egg white, for example, by reactive sputtering or by soaking the membrane in an appropriate solution and heating it up. Metals may be applied to the pyrolized carbons, such as eggshell membrane or egg white, for example, by sputtering. Nitrides may be added, for example, by reactive sputtering. Other methods of coating (functionalizing) the membrane or egg white with various materials include, for example, physical vapor deposition; chemical vapor deposition; electrodeposition; and wet chemical methods, such as sol-gel synthesis, hydrothermal processing, precipitation, and ionothermal processing.

Example: The eggs used in the experiments are produced at Sparks egg farm in Calgary. To keep the most consistence, only the eggs weighting between 56 g to 60 g are used. The eggshell membranes are obtained by etching away the hard eggshell (mainly CaCO3) in 1M HCl. After cleaning with DI water, the eggshell membrane is put on a 1 cm2 glassy carbon disc, dried and carbonized at 800° C. for 2 hours in a tubular furnace with argon flow of 100 mL min-1. The heating rate is 1° C. min-1. After the carbonization, the eggshell membrane converts to a uniform carbon film strongly bonded on the surface of carbon disc. The carbonized eggshell membrane (CESM) supported on carbon disc is washed in 20% KOH at 70° C. for 2 hours and then in 2M HCl for 15 hours at room temperature to remove the impurities. The CESM supported on carbon disc is activated at 300° C. for 2 hours in air at a heating rate of 10° C. min-1. During the activation process, 10% weight loss is detected. The chemically activated eggshell membrane (AC-KOH) is prepared by heating the mixture of dry eggshell membrane and KOH (1:4 by weight) to 700° C. for 2 hours under argon atmosphere. The obtained fine carbon powder is washed with 2M HCl and DI water before use.

The carbon disc with activated CESM is sealed in a Teflon electrode assembly using epoxy resin and directly used as electrode without any binder between CESM and glassy carbon disc. For AC-KOH materials, the slurry of 95% AC-KOH and 5% PVDF (binder) in N-methylpyrrolidone solvent is coated on glassy carbon disc and then dried at 110° C. overnight in vacuum oven to obtain the electrode. The electrochemical experiments are performed in Teflon beakers with Pt wire as counter electrodes. Hg/HgO (1M NaOH) and Hg/HgSO4 (saturated K2SO4) are used as reference electrodes individually in 1M KOH or 1M H2SO4. For convenience, all the potentials discussed in this paper have been converted to potential versus normal hydrogen electrode (NHE). The Cyclic voltammetry and galvanostatic charge-discharge cycling and impedance analysis are performed on a Solatron 1470E Multichannel Potentiostat/CellTest System. The specific capacitance of CESM is calculated as $It/m\Delta E$, where I is the change/discharge current, t is the discharging time, m is the mass of electrode materials and $\Delta E$ stands for the potential window.

For the surface area analysis, eggshell membrane is also carbonized on Si wafer under the same condition. In this case, the CESM film can be peeled off from Si wafer after the treatment in 20% KOH. We believe the surface area of obtained CESM films is a good estimation of the CESM carbonized on glassy carbon disc. The porous texture of carbon materials is characterized by nitrogen adsorption at 77k (Quantachrome Autosorb-1). A Hitachi S-4800 scanning electron microscope (SEM) equipped with field emission gun and a JEOL 2100 transmission electron microscopes (TEM) are used to study the morphologies of CESM. X-ray photoelectron spectroscopy (XPS) is obtained on an Axis Ultra spectrometer. The element analysis are performed on Thermo Fisher Scientific (formerly Carlo Erba) EA 1108 CHNS-O elemental analyzer and Perkin Elmer's Elan 6000 for metals. Before XPS and element analysis, the samples were dried at 110° C. in vacuum oven over night to remove the absorbed water. The conductivity of CESM is measured by Pro4 from Lucas Labs.

Chicken eggshell membrane has around 12%-15% N in its organic matter. After carbonization, the N content in as-prepared CESM is around 8% by the combustion element analysis shown in Table 1 below. In fact, the eggshell membranes are mainly proteins (rich in N) with very small amount of carbohydrates (no N). It is not surprising that CESM contains more N than chars from biomaterials rich in cellulose and lignin (for example, woods). The N atoms would contribute to the good conductivity of CESM since the electrical conductivity of N-containing carbons is known to be normally higher than that of N-free carbons. When further activated, the CESM-300 keeps similar N content. However, the chemically activated eggshell membrane (AC-KOH) contains only 1.3% N indicating most of N functional groups are destroyed in the chemical activation process. The O content in as-prepared CESM is 9.4% which increases to 10.67% after the further activation. AC-KOH contains slightly more O than CESM-300 but the atomic ratio between O and C (O/C) is almost same for both samples. XPS is also used identify the content of N and O. It is interesting to compare the atomic N/C and O/C ratios obtained by combustion element analysis to those by XPS since XPS provides the information at the top layers (1-10 nm) of surface. The N/C ratios obtained by both technologies are relatively consistent in all samples. However, the O/C ratio obtained by XPS is significant higher than that from combustion element analysis in activated CESM. The differences of 0.0285 in O/C ratio indicate the oxygen content on surface is 1.25 times of that in bulk materials in CESM-300. This is important for the application of supercapacitors since only the oxygen on surface has contribution to pseudocapacitance. It can also be concluded that the O content on surface increase 30.1% while the O content in bulk materials increase only 14% during the activation process in hot air. That clearly indicates the activation (oxidation) of CESM only happens on the surface of carbon fibers and the cores of the carbon fibers are unlikely activated or at least not fully activated. Besides C, N, and O, activated CESM also contains around 3-5% other impurities (mainly Si, Ca, K, Cl, see ICP trace metal analysis in Table 2 below).

TABLE 1

Elements composition information of eggshell membrane derived carbons.

| | Element analysis | | | | | XPS | |
|---|---|---|---|---|---|---|---|
| | C wt % | O wt % | N wt % | O/C[a] | N/C[a] | O/C[b] | N/C[b] |
| CESM-AP | 77.51 | 9.72 | 8.15 | 0.0941 | 0.0901 | 0.1013 | 0.0942 |
| CESM-300 | 76.52 | 10.99 | 8.48 | 0.1077 | 0.0951 | 0.1362 | 0.0921 |
| AC-KOH | 81.93 | 12.26 | 1.31 | 0.1123 | 0.0137 | 0.1202 | 0.0147 |

[a]Atomic ratio from combustion element analysis.
[b]atomic ratio from XPS

TABLE 2

The contents of metals in activated CESM by trace metal analysis.

| | Li | Be | B | Na | Mg | Al | Si | P |
|---|---|---|---|---|---|---|---|---|
| DL[a] (ppm) | 0.05 | 0.1 | 2 | 0.5 | 2 | 0.2 | 5 | 5 |
| Content (ppm) | 4.41 | <DL | <DL | 1146 | 249 | 236 | 421 | 1236 |

| | K | Ca | Ti | V | Cr | Fe | Mn | Co |
|---|---|---|---|---|---|---|---|---|
| DL[a] (ppm) | 6 | 31 | 0.09 | 0.05 | 0.05 | 3.7 | 0.03 | 0.03 |
| Content (ppm) | 10705 | 10179 | 28.0 | <DL | 55.5 | 518 | 9.94 | 23.1 |

| | Ni | Cu | Zn | Ga | Ge | As | Se | Rb |
|---|---|---|---|---|---|---|---|---|
| DL[a] (ppm) | 0.06 | 0.03 | 0.08 | 0.01 | 0.02 | 0.06 | 0.2 | 0.04 |
| Content (ppm) | 68.6 | 537 | 890 | 0.02 | 0.09 | 25.1 | <DL | 12.5 |

| | Sr | Y | Zr | Nb | Mo | Ru | Pd | Ag |
|---|---|---|---|---|---|---|---|---|
| DL[a] (ppm) | 0.03 | 0.02 | 0.09 | 0.04 | 0.02 | 0.01 | 0.01 | 0.01 |
| Content (ppm) | 10.7 | 0.23 | 10.1 | 2.61 | 89.2 | 0.23 | 6.35 | 5.28 |

| | Cd | Sn | Sb | Te | Cs | Ba | La | Ce |
|---|---|---|---|---|---|---|---|---|
| DL[a] (ppm) | 0.06 | 0.06 | 0.01 | 0.02 | 0.02 | 0.03 | 0.03 | 0.03 |
| Content (ppm) | 0.22 | 5.46 | 0.63 | 0.43 | <DL | 5.94 | 0.57 | 1.76 |

| | Pr | Nd | Sm | Eu | Gd | Tb | Dy | Ho |
|---|---|---|---|---|---|---|---|---|
| DL[a] (ppm) | 0.004 | 0.03 | 0.04 | 0.03 | 0.03 | 0.03 | 0.04 | 0.02 |
| Content (ppm) | 0.037 | 0.14 | <DL | <DL | <DL | <DL | <DL | <DL |

| | Er | Tm | Yb | Lu | Hf | Ta | W | Re |
|---|---|---|---|---|---|---|---|---|
| DL[a] (ppm) | 0.04 | 0.006 | 0.05 | 0.04 | 0.05 | 0.02 | 0.08 | 0.003 |
| Content (ppm) | <DL | <DL | <DL | <DL | 0.83 | 9.37 | 1.90 | 0.046 |

| | Os | Ir | Pt | Au | Tl | Pb | Th | U |
|---|---|---|---|---|---|---|---|---|
| DL[a] (ppm) | 0.08 | 0.04 | 0.01 | 0.01 | 0.05 | 0.03 | 0.01 | 0.03 |
| Content (ppm) | 0.14 | <DL | 1.67 | 2.19 | 0.06 | 21.2 | 0.16 | 0.06 |

[a]detection limits of the equipment.

The surface N functionalities are identified by the deconvolution of high-resolution N 1s core level peaks The N 1s core level is fitted using CasaXPS software by 4 peaks representing pyridinic N (N-6 at 398.0±0.2 eV), pyrrolic or pyridonic N (N-5 at 399.7±0.2 eV), quaternary N (N-Q at 400.8±0.2 eV) and oxidized N (N-X at 402.5±0.2 eV). The percentage of each component is shown in Table 3 below. It is interesting to find that the percentage of N-6 decreased from 39.88% to 20.83% while the percentage of N-5 increased from 25.74% to 47.49% after the activation process in air. That indicates around half of pyridinic N converted into pyrrolic N or pyridonic N. We are also interested in the N at the edge of graphite plane (N-5, N-6, and N-X) which is known to be more active than that located in the middle of graphite plane (N-Q). The percentage of N on edge in our CESM is very high, 72.51% in CESM-AP and 76.96% in CESM-300.

TABLE 3

Approximate distribution of N-functional groups obtained by fitting the N 1s core level XPS spectra.

| | % of total N 1s | | | |
|---|---|---|---|---|
| Functional groups | N-Q | N-5 | N-6 | N-X |
| B.E. (eV) | 400.8 | 399.7 | 398.0 | 402.5 |
| CESM-AP | 27.49 | 25.74 | 39.88 | 6.89 |
| CESM-300 | 23.04 | 47.85 | 20.83 | 8.28 |

The surface area and pore structures characterization parameters are summarized in Table 4 below. For CESM materials, the specific surface area calculated by BET method has increased from 17 m2 g-1 to 221 m2 g-1 and the average pores size dropped from 8.0 nm to 1.2 nm after the activation process. The surface area from micropores (<2 nm) calculated by the t-plot method is 0 m2 g-1 for as-prepared CESM and 193 m2 g-1 for activated CESM. Obviously, mainly micropores are formed on CESM surface during the partially oxidation and removing of carbon in hot air which leads to the increase of specific surface area and porosity. However, even after activation, the specific surface area and porosity of CESM is only about ⅐ of those of chemically activated eggshell membrane (AC-KOH). That also suggests the CESM is only partially activated on the surface.

TABLE 4

Physical and electrical properties of eggshell membrane derived carbons.

| | $S_{BET}$ m$^2$/g | $S_{micro}^{[a]}$ m$^2$/g | $V_{total}^{[b]}$ cm$^3$/g | APD$^{[c]}$ nm | Resistance $\Omega$m | C$^{[d]}$ F/g |
|---|---|---|---|---|---|---|
| CESM-AP | 17.03 | 0 | 0.068 | 8.07 | 4.6 × 10$^{-4}$ | 120 |
| CESM-300 | 221.2 | 193.1 | 0.13 | 1.2 | 8.9 × 10$^{-4}$ | 297 |
| AC-KOH | 1575 | 709.1 | 0.98 | 1.25 | 1.8 × 10$^{-2}$ | 203 |

[a]surface area of micropores calculated by t-plot method.
[b]Total pore volume.
[c]Average pore diameter.
[d]Capacitance at current density of 0.2 A g$^{-1}$ in 1M KOH.

The microstructures of eggshell membrane directly carbonized and activated on glassy carbon were investigated by SEM. From the cross section view at the edge (FIG. 1A), it can be seen that the activated CESM is a highly porous film with a thickness of around 10 μm. Given the measured weight of activated CESM is 0.5 mg cm-2, its density is calculated to be 0.5 g cm-3, similar to activated carbons. The macroporous network structure composed of interwoven and coalescing carbon fibers ranging mainly from 0.2-2 μm in diameter can be observed in planview (FIG. 1B). Clearly the typical structure of eggshell membrane is successfully preserved by using our carbonization and activation procedure. SEM analysis revealed no difference in the microscope structures of the CESM before and after activation. This is expected since the pores introduced by the activation process are mainly micropores. The macropores between carbon fibers and the micropores on the carbon fibers form a hierarchical porous structure evenly distributed in activated CESM in large scale. This kind of long-range continuity of the pore network is known to be critical for fast electrolytes transfer. With TEM (FIG. 1C), we can start to see the disordered texture of activated CESM and some pores at the edge of a thin flake. As mentioned in the previous discussion, the significant O content increase on surface and relative low surface area and porosity after activation indicate the activation process mainly happened on the surface of carbon fibers of CESM and therefore a carbon-carbon core-shell structure is likely formed (FIG. 1D). The activated shell containing more O and micropores (surface area) is great for the application of supercapacitors. But it also has a higher electrical resistance due to the micropores generated. The un-activated core can serve as electron collector. One of the advantages of 3D coalescing structure of CESM is that there is no contact resistance between fibers. Although the less conductive micropore-rich shell formed on top of fibers during activation, the highly conductive internal cores of fibers still coalesced into one piece, which makes the activated CESM an excellent conductive system. The electrical resistance measured by 4 point probing method is 4.6×10-4 Ωm for as-prepared CESM and 8.9×10-4 Ωm for activated CESM. The increase of resistance is caused by the micropores formed during activation. They are much lower than the resistance of chemically activated eggshell membrane (1.8×10-2 Ωm) compacted under 20 MPa (10-100 MPa is the most common pressure used to make carbon electrodes). For the commercial high surface area activated carbon, the resistance is in the range of 0.5-3.0×10-2 Ωm in compacted form. The Raman spectra (Fig S1) demonstrate that the CESM is composed of disordered carbon, similar to activated carbon. However, due to its unique structure, the systematic conductivity of CESM is one order magnitude higher than that of activated carbon, which makes it an ideal electrode material for high power density supercapacitors.

Figure 2:
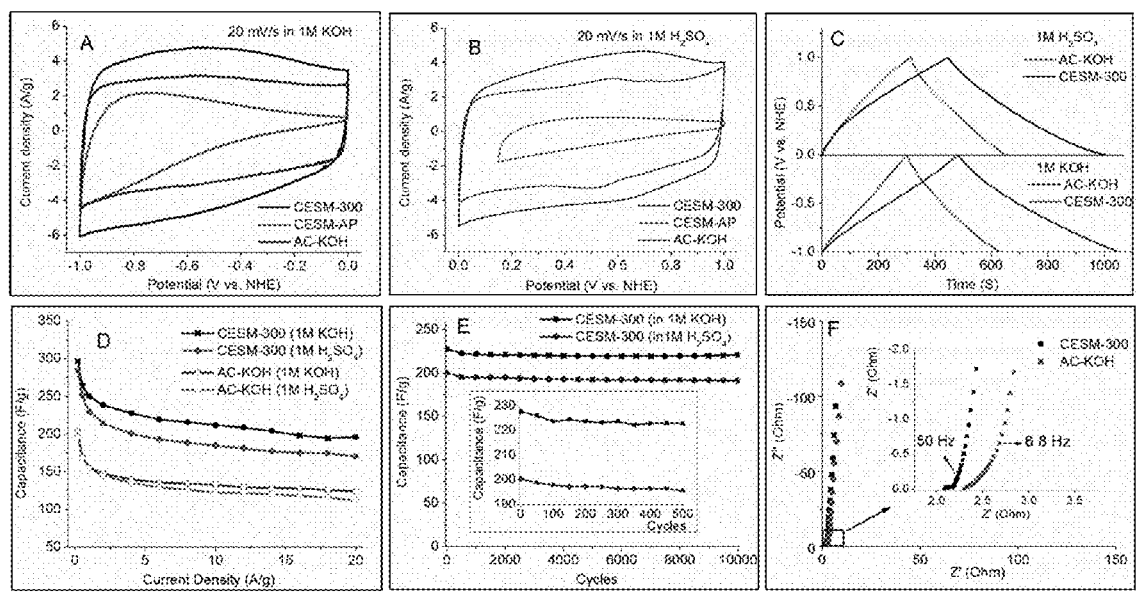
FIG. 2 shows electrochemical performance of eggshell membrane derived carbons in three-electrode system. Cyclic voltammograms in 1M KOH (A) and in 1M $H_2SO_4$ (B); galvanostatic charge/discharge curves at 0.5 A $g^{-1}$ (C); gravimetric capacitances measured at various charge/discharge current density (D); the evaluation of specific capacitance versus the number of cycling at 4 A $g^{-1}$ (E); Nyquist plots in 1M $H_2SO_4$ (F). A and B: at −0.4 (A) and 0.4 (B) along the X-axis, the curves from top to bottom are: CESM-300, AC-KOH, CESM-AP, CESM-AP, AC-KOH, and CESM-300. C: upper graph—curve with leftmost peak is AC-KOH, next is CESM-300, lower graph—curve with leftmost peak is AC-KOH, next is CESM-300. D: curves from top to bottom are CESM-300 (1M KOH), CESM-300 (1M H2SO4), AC-KOH (1M KOH), AC-KOH (1M H2SO4). E: both graphs—top curve is CESM-300 (in 1M KOH), bottom curve is CESM-300 (in 1M H2SO4). F: both graphs—left curve is CESM-300, right curve is AC-KOH.

Electrochemical performance of activated CESM is evaluated in three-electrode system (FIG. 2). The chemically activated eggshell membrane (AC-KOH) has also been tested as a reference. AC-KOH exhibit almost rectangular cyclic voltammogram (CV) in both 1M KOH (FIG. 2A) and 1M H2SO4 (FIG. 2B), indicating the dominant contribution from EDL capacitance. The small humps at 0.5-0.6V (vs NHE) in 1M H2SO4 correspond to pseudocapacitive contribution of quinone/hydoquinone redox processes. The activated CESM presents similar CV but with more developed humps in both 1M KOH and 1M H2SO4, suggesting big contribution from pseudocapacitance. Notably, the CV humps of activated CESM in 1M H2SO4 shift to 0.6-0.7V (vs NHE) indicating the pseudocapacitive contribution is not only from the O functionalities but also from the N functionalities. Different from the activated CESM, the as-prepared CESM shows a triangle-like CV. The difference may relate to the change of surface functionalities during activation, such as the N functionalities discussed in XPS analysis. More CVs at different sweeping rate can be found in Fig. S2. The reversible capacitive behavior of activated CESM can also be proven by its triangle-like charge-discharge curves in both basic and acidic electrolytes (FIG. 2C). The asymmetry is caused by the pseudocapacitive behavior of the functional groups. The specific capacitance of activated CESM calculated by the galvanostatic charge/discharge is 297 F g-1 in 1M KOH and 284 F g-1 in 1M H2SO4 at current density of 0.2 A g-1 (FIG. 2D). Those are among the best performance carbon materials for supercapacitors as compared with results reported by L. L. Zhang, X. S. Zhao, *Chem. Soc. Rev.* 2009, 38, 2520; C. O. Ania, V. Khomenko, E. Raymundo-Pinero, J. B. Parra, F. Beguin, *Adv. Funct. Mater.* 2007, 17, 1828; E. Raymundo-Pinero, F. Leroux, F. Beguin, *Adv. Mater.* 2006, 18, 1877; E. Raymundo-Pinero, M. Cadek, F. Beguin, *Adv. Funct. Mater.*

2009, 19, 1032; L. Zhao, L. Z. Fan, M. Q. Zhou, H. Guan, S. Y. Qiao, M. Antonietti, M. M. Titirici, *Adv. Mater.* 2010, 22, 5202. Considering the surface area of activated CESM is significant lower (221 m2 g-1) comparing to activated carbon (typically 500-3000 m2 g-1), the capacitance per surface area reaches 120 µF cm-2, much higher than the theoretical EDL capacitance (15-25 µF cm-2). That clearly indicates the capacitance is mainly the contribution of pseudocapacitance from the high-concentration N and O functionalities. Although the specific surface area of AC-KOH is 7 times higher than that of activated CESM, its specific capacitance is only 60%-70% of the specific capacitance of activated CESM. Considering both materials containing similar amount of 0, it can be concluded that activated CESM out-performs AC-KOH mainly due to its high N content and the unique 3D structure. In fact, it is a common phenomenon that the specific capacitance of N-rich carbon materials is closely related to the N contents rather than the specific surface area. With the dramatic increase of specific surface area by further activation, only a small portion of capacitance increase can be achieved. With proper N content, high capacitance can be achieved even with relative low specific surface area of around 100-200 m2 g-1. That is an advantage of the N-rich carbon materials since high specific surface area normally also means high porosity and poor conductivity.

The ability to deliver energy at high current rate is the most important advantage of ECs over batteries. Due to its hierarchy porous structure (fast electrolytes transfer) and 3D interconnected structure (efficient electron transfer), the activated CESM shows a specific capacitance of 196 F g-1 in 1M KOH and 172 F g-1 in 1M H2SO4 even at high current density of 20 A g-1. The cycle life of activated CESM was also evaluated at high current load (FIG. 2E). After 10,000 charge/discharge cycles at 4 A g-1, capacitance loss is only 3% in KOH and 5% in H2SO4. In fact, the capacitance stabilized after the first 100 cycles (the inset of FIG. 2E). It has been proven that the N-rich carbons obtained by carbonization of biomass have long cycle life because the N and O are incorporated in the carbon frame. However, the durability of activated CESM in cycling is even significantly better than those of N-rich carbons which are at the range of 5-7% loss in 2,000 cycles and 10-15% loss in 10,000 cycles as reported by C. O. Ania, V. Khomenko, E. Raymundo-Pinero, J. B. Parra, F. Beguin, *Adv. Funct. Mater.* 2007, 17, 1828, E. Raymundo-Pinero, F. Leroux, F. Beguin, *Adv. Mater.* 2006, 18, 1877, L. Zhao, L. Z. Fan, M. Q. Zhou, H. Guan, S. Y. Qiao, M. Antonietti, M. M. Titirici, *Adv. Mater.* 2010, 22, 5202. This may be related to unique structures. Since the carbon fibers in activated CESM are coalesced into one piece, no active materials will physically loss contact with electrode and lead to capacitance fading during the cycling.

The fast electrolytes transfer in the activated CESM can be confirmed by the Nyquist plots (FIG. 2F) recorded from 0.025 to 50,000 Hz at open circuit potential in 1M H2SO4. The ion diffusion process can be characterized by the length of the Warburg-type line (the slope of the 45° portion of the Nyquist lots). The Warbug-type line of activated CESM is much shorter than that of AC-KOH. That demonstrates the fast ion transfer in the hierarchical porous structure of activated CESM. The "onset" frequency is defined as the highest frequency where the impedance of electrode starts to be dominated by capacitive behavior (Nyquist plot starts to go vertical). It reflects the highest frequency to achieve most of the capacitance. The "onset" frequency of activated CESM is 50 Hz higher than that of AC-KOH (6.8 Hz), indicating the fast capacitive responds of activated CESM.

In summary, we have demonstrated that one of the most common daily wastes—the eggshell membrane—can be converted into high performance carbon materials for supercapacitors. Due to the long-range continuous hierarchical porous structure and high N and O contents, the activated CESM shows a high specific capacitance of 297 F g-1 and excellent reversibility with cycling efficiency of 97% after 10,000 cycles in 1M KOH. Considering over 1,000 billion eggs are consumed per year globally, and that 30-40 mg finished carbon is derivable from one egg, the eggshell membrane is indeed a reliable and sustainable resource for clean energy storage.

Similar to chicken eggshell membranes, chicken egg whites are protein-rich with a naturally high nitrogen content and are considered a waste product in many operations such as commercial egg production. Useful carbon material may be obtained by pyrolysis of egg white.

Materials: The eggs used in the experiments are produced at Sparks egg farm in Calgary. Stainless steel spacers (316 L), 2032 type button cell, Li metal foils, polyethene separator (porosity ~36-44%, pore size ~0.03 mm) and electrolyte (1 M $LiPF_6$ in ethylene carbonate/dimethyl carbonate, 1:1 in volume) for battery assembly are obtained from MTI Technologies. All other reagents were purchased from Aldrich, unless otherwise specified and were used without further purification.

Synthesis of Mesoporous Cellular Foam (MCF) Silica: The MCF silica is prepared following known procedures. The MCF is to be used as a template for the egg white protein. Other materials may be used, for example polymer or silicon spheres. The template needs to have suitable pore size, resistance to heating and at least in some embodiments be removable for example by being dissolved in a suitable solvent. In a typical experiment, 4.0 g P-123 was dissolved in 200 ml HCl (2M) at 40° C. Then 11.2 g TEOS and 4.0 g TMB were added to the solution and kept stirring for 24 h. The mixture was transferred into an autoclave with Teflon inline and heated to 95° C. for 3 days. When cooled down, the white powder was separated from the mixture. The powder was calcined at 550° C. in air for 5 h to remove the surfactant. The obtained mesoporous silica was then thiol-modified by dispersing 1 g MCF in 100 ml MPTES ethanol solution (1%) for 2 hours. The SH-MCF was separated, washed with ethanol and dried at 60° C.

Synthesis of Mesoporous Carbon Derived from Egg White: Egg white (30 ml, roughly the amount from one egg) was first dissolved in $(NH_4)_2SO_4$ aqueous solution (500 mL, 0.25M) to form a transparent protein solution. SH-MCF (1 g) was suspended and stirred in the protein solution for 4 hours. Then the mesoporous silica with proteins adsorbed in the channels was filtered out, rinsed with DI water, dried at 60° C. and then pyrolyzed in a tubular furnace (650-850° C. for 2 hours, heating rate: 5° C. $min^{-1}$) under argon atmosphere. After the pyrolysis, the silica was removed in 2% HF. The obtained fine carbon powder is washed 3 times with DI water before use.

Electrochemical Characteristics: The slurry of 85% MPEw, 10% carbon black (Super-P) and 10% PVDF (binder) in N-methylpyrrolidone was coated on glassy carbon disc and then dried at 110° C. overnight in vacuum oven to obtain the electrode with a loading of around 1 mg $cm^{-2}$. The electrochemical experiments were performed in 1M $H_2SO_4$ with Pt wire as counter electrodes, $Hg/HgSO_4$ (saturated $K_2SO_4$) as reference electrodes. The Cyclic voltammetry and galvanostatic charge-discharge cycling were performed on a Solatron 1470E Multichannel Potentiostat/CellTest System. The specific capacitance of MPEw was calculated as It/mΔE, where I is the change/discharge current, t is the discharging time, m is the mass of electrode materials and ΔE stands for the potential window (after deduction of IR drop). For the battery test, the slurry was coated and dried on stainless steel spacers (around 1 mg active materials on one electrode). The obtained electrode, polyethene separator and Li metal foil were assembled into a button cell filed with electrolytes (1 M $LiPF_6$ in ethylene carbonate/dimethyl carbonate) in argon atmosphere.

Chemical Analysis and Textural Characterization: The porous texture of carbon materials was characterized by nitrogen adsorption at 77k (Quantachrome Autosorb-1). A Hitachi S-4800 scanning electron microscope (SEM) equipped with field emission gun and a JEOL 2100 transmission electron microscope (TEM) were used to study the morphologies. X-ray photoelectron spectroscopy (XPS) was obtained on an Axis Ultra spectrometer. The N is core level was fitted using CasaXPS software. Before XPS analysis, the samples were dried at 110° C. in vacuum oven over night to remove the absorbed water.

Schematic 1 illustrates the current strategy for synthesis of the N-rich mesoporous carbon employing thiol modified mesoporous cellular foam (SH-MCF) templates. Egg whites are primarily water and proteins, the later including 54% ovalbumin, 12% ovotransferrin, 11% ovomucoid, 8% ovoglobulin, 3.5% ovomucin, 3.4% lysozyme and small amount of other components. To allow for the effective adsorption of these huge proteins a MCF was used as the template, since they possess much higher mass transfer efficiency than traditional cylindrical mesoporous silica. MCFs are composed of uniform, large cellular cells (25-30 nm, in this work) that are interconnected by windows forming a continuous 3D porous structure. The proteins adsorbed in MCF were pyrolyzed at 650° C., 750° C. or 850° C. under an inert atmosphere, with the template being subsequently removed. The resultant carbons are henceforth termed MPEw-650, MPEw-750 and MPEw-850, with the end numbers corresponding to the pyrolysis temperature.

MPEw carbons and the parent template exhibit type IV N2-adsorption isotherms with H1-type hysteresis loops at P/P0=0.75-0.9, a typical characteristic of large pore mesoporous materials The pore size distributions were calculated using the Barret-Joyner-Halenda (BJH) model and are shown in the figure insert. There is a sharp peak in the pore size distribution plots of all the MPEw carbons centered at 3.8 nm. That size agrees well with the wall thickness of the MCF template ( ). Obviously, those pores were mainly caused by the removal of the template. Besides the sharp peak, there is also a wide hump located at 10-20 nm, roughly in the same position as the MCF template. These large pores are the cellular pores duplicated from the MCF cells. The size of those cellular pores is known to be underestimated in BJH model. The actual size of these pores is 20-30 nm (see TEM analysis). The BJH model was adopted in this work for the precise evaluation of the 3.8 nm pores. All MPEw carbons show a specific surface area around 800 $m^2 g^{-1}$, as shown in table 5 below, mainly from the mesoporous pores (>90%, by t-plot method).

TABLE 5

Physical and electrical properties of MPEw carbons.

| | $S_{BET}$ | $S_{micro}$[a] | Composition[b] | | | Cg[c] | Cs[d] | $C_{Li}$[e] |
|---|---|---|---|---|---|---|---|---|
| | [$m^2g^{-1}$] | [$m^2g^{-1}$] | C wt % | N wt % | O wt % | [$Fg^{-1}$] | [$\mu Fcm^{-2}$] | [$mAhg^{-1}$] |
| MCF | 553.1 | 83.1 | | | | | | |
| MPEw650 | 805.7 | 43.2 | 87.17 | 9.30 | 3.35 | 390.4 | 48.5 | 1780 |
| MPEw750 | 803.9 | 47.9 | 88.79 | 6.45 | 4.76 | 312.8 | 38.9 | 1229 |
| MPEw850 | 810.3 | 49.3 | 88.60 | 5.36 | 6.04 | 235.7 | 29.1 | 1102 |

[a]micropore surface area calculated by t-plot method;
[b]weight percent of elements obtained from XPS analysis;
[c], [d]capacitance and surface area normalized capacitance at current density of 0.25 A $g^{-1}$ in 1M $H_2SO_4$;
[e]discharge capacity at the $2^{nd}$ cycle, tested in a LIB half-cell configuration.

The advantage of using proteins as a carbon source is their intrinsically high nitrogen content. The XPS survey (FIG. 3), reveals that MPEw carbonized at 650° C. contain 9.30 wt % nitrogen, see table 5 above. With increasing pyrolysis temperatures of 750° C. and 850° C., the N-content decreases to 6.45 wt % and 5.36 wt %, respectively. These N-contents are much higher than what was reported for N-doped graphene utilized for LIBs anodes by Z. S. Wu, W. C. Ren, L. Xu, F. Li, H. M. Cheng, Acs Nano 2011, 5, 5463; H. Wang, C. Zhang, Z. Liu, L. Wang, P. Han, H. Xu, K. Zhang, S. Dong, J. Yao, G. Cui, J. Mater. Chem. 2011, 21, 5430; L. S. Panchokarla, K. S. Subrahmanyam, S. K. Saha, A. Govindaraj, H. R. Krishnamurthy, U. V. Waghmare, C. N. R. Rao, Adv. Mater. 2009, 21, 4726. Although the Li-ion storage mechanism in N-rich carbon is still unclear, it is believed to relate to the strong electronegativity of nitrogen and the hybridization of nitrogen lone pair electrons with the it electrons in carbon, which makes favorable binding sites for Li-ions. The high-resolution N is core level XPS spectra can be deconvoluted into 4 peaks ( ) representing pyridinic N (N-6 at 398.0±0.2 eV), pyrrolic or pyridonic N (N-5 at 399.7±0.2 eV), quaternary N (N-Q at 400.8±0.2 eV) and oxidized N (N-X at 402.5±0.2 eV). Comparing with the samples carbonized at higher temperature, MPEw-650 contains more N-6 and less N-Q functionalities, see table 6 below. Although MPEw-650 has slightly lower N-content than the reported polypyrrole-derived CNF (10.25%), it contains significantly more pyridinic-N. Known theoretical calculation suggests that pyridinic-N doped graphene is more favorable than pyrrolic-N doped for Li-ion storage.

TABLE 6

Approximate distribution of N-functional groups obtained by fitting the N 1s core level XPS spectra.

| | % of total N 1s | | | |
|---|---|---|---|---|
| Functional groups | N-Q | N-5 | N-6 | N-X |
| B.E. (eV) | 400.8 | 399.7 | 398.0 | 402.5 |
| MPEw650 | 25.9 | 29.4 | 40.8 | 3.9 |

TABLE 6-continued

Approximate distribution of N-functional groups obtained by fitting the N 1s core level XPS spectra.

| Functional groups | % of total N 1s | | | |
|---|---|---|---|---|
| | N-Q | N-5 | N-6 | N-X |
| MPEw750 | 31.3 | 34.1 | 31.0 | 3.7 |
| MPEw850 | 36.4 | 25.2 | 31.4 | 7.1 |

In a Raman spectrum for carbon materials the G band is a characteristic feature of the graphitic layers and corresponds to the tangential vibration of the carbon atoms, while the D band corresponds to disordered carbon or defective graphitic structures. The intensity ratio of these two peaks partially depends on the graphitization degree. The intensity of D band (~1350 cm$^{-1}$) of MPEw-850 was significantly lower than its G band (~1600 cm$^{-1}$) with $I_G/I_D$=1.30, indicating that MPEw-850 is partially graphitized. With the decrease of pyrolysis temperature, the $I_G/I_D$ ratio dropped to 1.18 (MPEw-750) and 1.07 (MPEw-650). The partial graphitization of MPEw carbons may be related to the nature of proteins and ions in the egg white that could induce graphitization at such a relatively low temperature.

Figure 4:
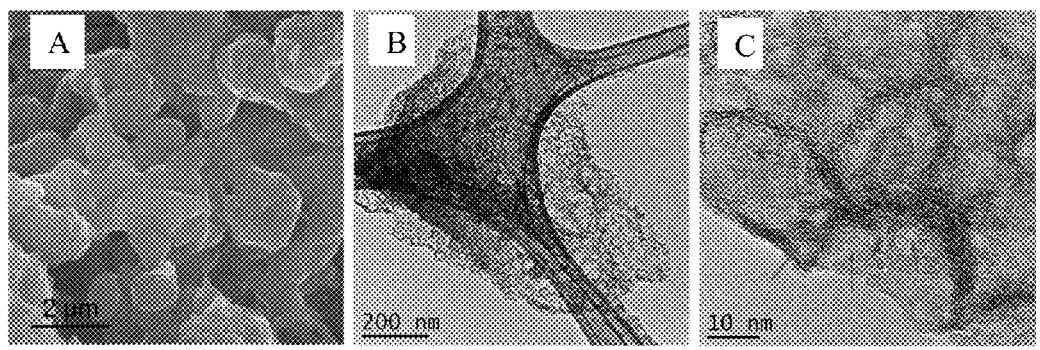
FIG. 4 is (A) low magnification SEM micrograph of MPEw-850; (B) and C) Low and high resolution TEM micrographs of MPEw-850. The carbon TEM grid support is visible in (E), while arrows point to different size pores in (F)
Figure 5:
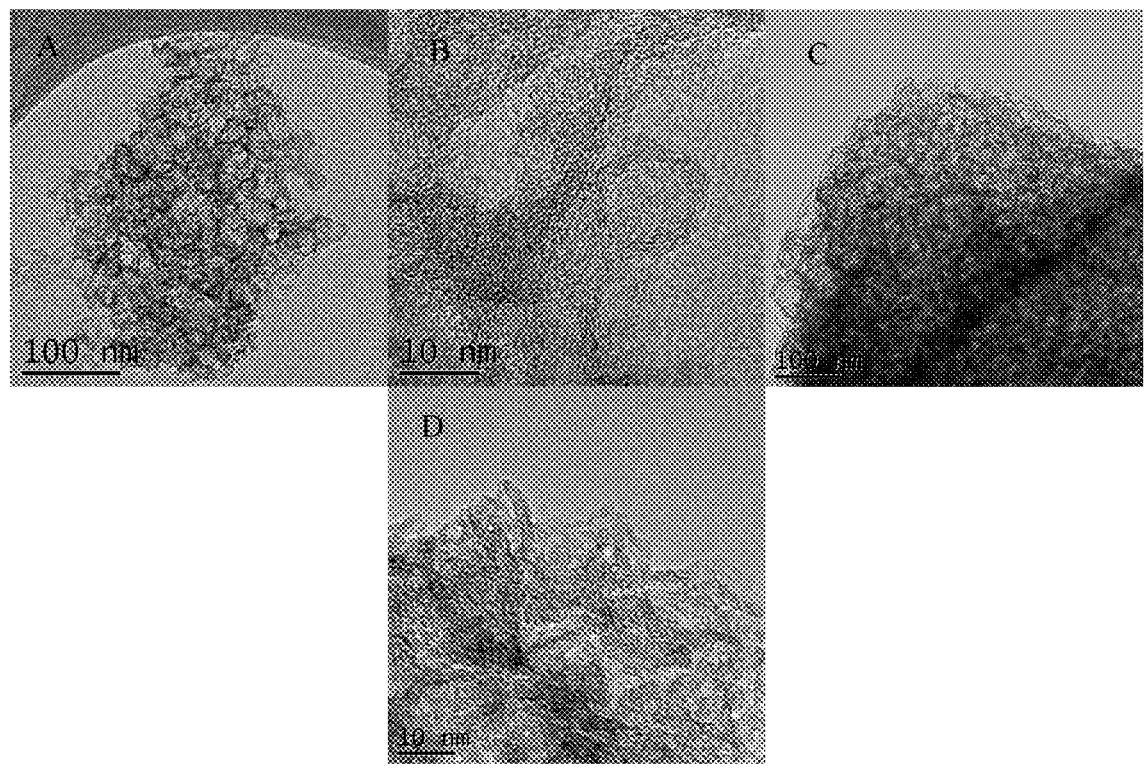
FIG. 5 is (A,B) and (C,D) TEM micrographs of MPEw-750 and MPEw-650, respectively.

MPEw-850 exhibits a typical "peanut-like" morphology with dimensions in the 0.5-3 μm range (FIG. 4A). This agrees well with the morphologies of the MCF template. Such a continuous integrated macro structure is known to be highly electrically conductive. FIG. 4B shows a low magnification TEM micrograph highlighting one thin MPEw-850 fragment resting on a holey carbon support. The figure illustrates the carbon's general frame structure that is composed of well-distributed large mesopores. These large mesopores were typically 20-30 nm in diameter with a wall thickness of 3-5 nm. FIG. 4C shows a high-resolution TEM micrograph of MPEw-850. The partial graphitization of this carbon is demonstrated by the distorted lattice fringes visible in the mesopore walls. At lower pyrolysis temperatures the lattice fringes are still present, but are less pronounced, indicating a lower degree of graphitization (FIG. 5). Some smaller mesopores are also present in the structure, being marked by the arrows in FIG. 4C. They likely originate from the uneven filing of the MCF template by the proteins. Egg white is composed of mainly 4 proteins whose molecular weights vary from 28,000 to 76,000 g mol$^{-1}$. Driven by a number of non-covalent interactions such as hydrogen bonding, ionic interactions, Van Der Waals forces and hydrophobic packing, proteins filled in the pores can further fold into different specific spatial configurations that will generate pores smaller than the pore size of the MCF template.

Figure 6:
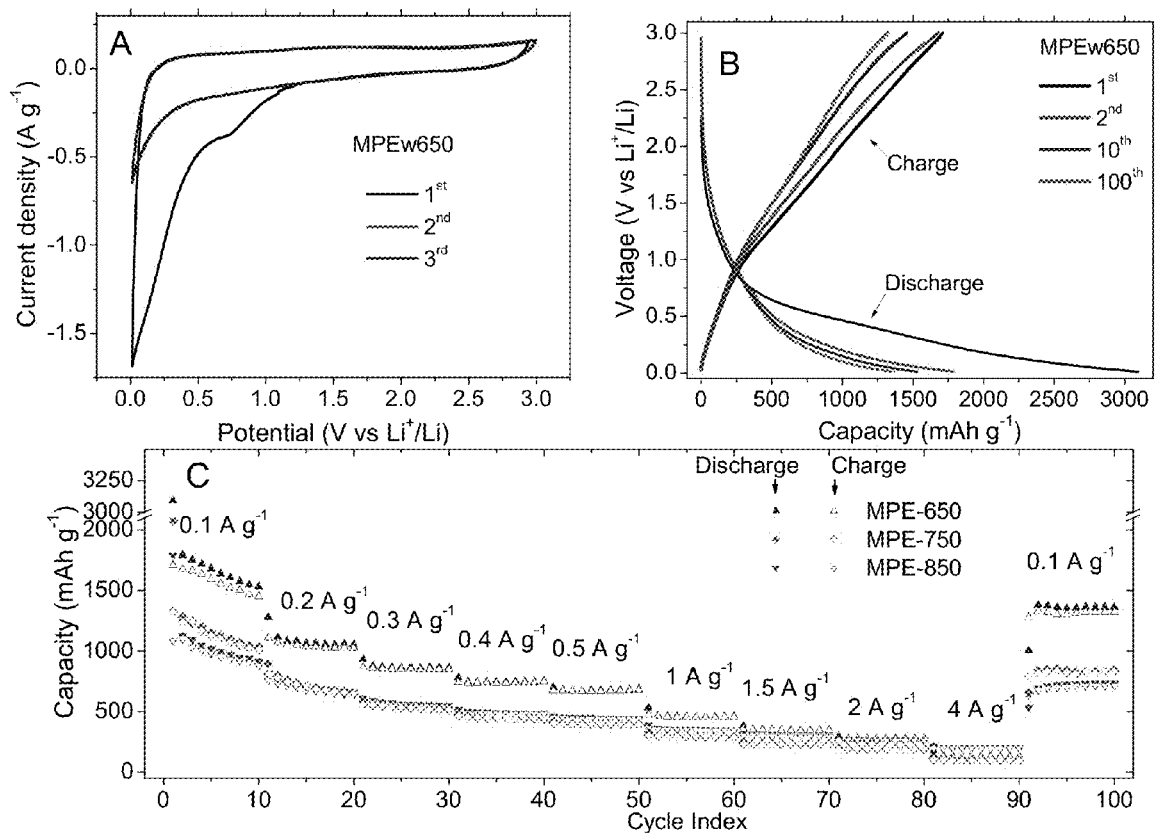
FIG. 6 shows Electrochemical performance of MPEw carbons tested in a LIB half-cell configuration. (A) Cyclic voltammograms of MPEw-650, tested at 0.1 mV/s; (B) charge/discharge curves of MPEw-650, tested at 0.1 A $g^{-1}$; (C) charge/discharge capacity versus cycle number for the three carbons. A: lower curve is $1^{st}$, upper curve is $2^{nd}$ and $3^{rd}$ overlying each other, B: charge graph—curves from top to bottom are $100^{th}$, $10^{th}$, $2^{nd}$, $1^{st}$, discharge graph—curves from top to bottom are $1^{st}$, $2^{nd}$, $10^{th}$, $100^{th}$, C: between 0-20 and 90-100 on the x-axis—curves from top to bottom are MPE-650, MPE-750, MPE-850, between 20-70 on the x-axis—curves from top to bottom are MPE-650, MPE-850, MPE-750, between 70-80 on the x-axis—top curve is MPE-850 overlying MPE-650, bottom curve is MPE-750, between 80-90 on the x-axis—curves from bottom to top are MPE-850, MPE-650, MPE-750.
Figure 7:
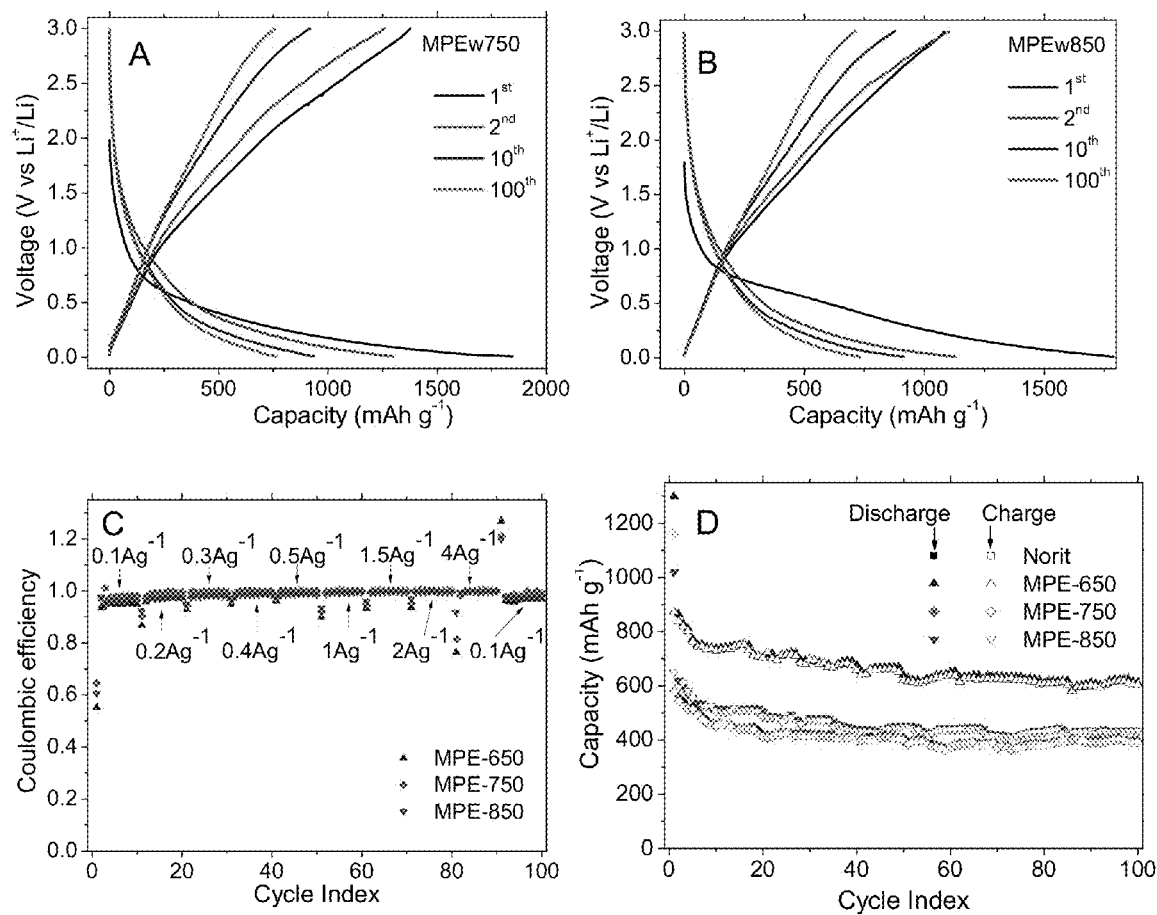
FIG. 7 is LIB half-cell tests of MPEw. (A) and (B) Charge/discharge curves of MPE-750 and of MPE-850, tested at 0.1 A g$^{-1}$; (C) cycling coulombic efficiency of the three carbons at various charge/discharge rates; (D) capacity versus cycle number of the three carbons, tested at 0.5 A g$^{-1}$. A: charge graph—curves from top to bottom are $100^{th}$, $10^{th}$, $2^{nd}$, $1^{st}$, discharge graph—curves from top to bottom are $1^{st}$, $2^{nd}$, $10^{th}$, $100^{th}$, B: charge graph—curves from top to bottom are $100^{th}$, $10^{th}$, $2^{nd}$, $1^{st}$, discharge graph—curves from top to bottom are $1^{st}$, $2^{nd}$, $10^{th}$, $100^{th}$, C: MPE-750, MPE-850, MPE-650 curves overlie each other, on the left side of the graph MPE-750 is slightly above and MPE-650 is slightly below MPE-850, D: curves from top to bottom are MPE-650, MPE-850, MPE-750.

The performance of MPEw carbons as a LIB anode material is investigated using a half-cell configuration countered with metallic lithium, with 1 M LiPF$_6$ in ethylene carbonate/dimethyl carbonate (1:1 in volume) electrolyte. FIGS. 6A and 6B show the cyclic voltammograms (CV) and charge/discharge curves of MPEw-650. The charge/discharge curves of MPE-750 and of MPE-850 are shown in FIG. 7. MPEw-650 exhibits a typical CV curve of a non-graphite carbon anode material, with a pronounced cathodic peak at 0-1 V during cycle 1 and at 0-0.3 V during cycles 2 and 3. Moreover the intensity of this peak at cycle 1 is much stronger than at 2 and 3. These differences are related to the irreversible consumption of charge via the formation of the solid electrolyte interphase (SEI) layer, as well as to the irreversible loss of some Li storage sites within the carbon. For the same reason, the discharge curve of MPEw-650 at cycle 1 shows a much higher capacity (3,094 mAh g$^{-1}$, at 0.1 A g$^{-1}$) than at cycle 2 (1,780 mAh g$^{-1}$) (FIG. 6B). Overall, the measured capacities of MPEw-650 are extraordinarily high. Even comparing with the CNF derived from polypyrrole web (with 10.25% N) [L. Qie, W. M. Chen, Z. H. Wang, Q. G. Shao, X. Li, L. X. Yuan, X. L. Hu, W. X. Zhang, Y. H. Huang, Adv. Mater. 2012, 24, 2047], which represents the state-of-the-art in carbon electrode energy density, MPEw-650 still demonstrates a higher capacity. This may be attributed to the large amount of mesopores serving as Li-ion reservoirs and a much higher pyridinic-N content in our materials. In fact, the 1,780 mAh g$^{-1}$ value is the highest reversible capacity ever reported for any carbon-based material. Even the capacity at the 100$^{th}$ cycle (1,365 mAh g$^{-1}$) is more than 3 times higher than the theoretical capacity of graphite (372 mAh g$^{-1}$).

FIG. 6C shows the capacity of MPEw carbons at various discharge/charge current densities during cycling. The coulombic efficiency (charging capacity/discharging capacity) in the first cycle is 55% for MPEw-650, 65% for MPEw-750 and 60% for MPEw-850. These are higher than values reported for un-doped mesoporous carbon [H. S. Zhou, S. M. Zhu, M. Hibino, I. Honma, M. Ichihara, Adv. Mater. 2003, 15, 2107], suggesting that the N functionalities and/or the partially graphitized structure can reduce the extent of the irreversible capacity loss reactions that occur during the first cycle. FIG. 7C demonstrates that during the subsequent cycling, the coulombic efficiency of all three carbons is above 95%. With the increase of charge/discharge current, the capacities of MPEw carbons drops to 865, 535 and 560 mAh g$^{-1}$ at 0.3 A g$^{-1}$, and 460, 295 and 355 mAh g$^{-1}$ at 1.0 A g$^{-1}$. It is notable to observe that the carbon with the highest graphitization (MPEw-850) shows the best rate capability, showing the highest capacity (205 mAh g$^{-1}$) at 4 A g$^{-1}$.

All three carbons exhibit a similar specific surface area and a similar pore size distribution. The total amount of microporosity is only 12% higher in the MPEw-850 versus in the MPEw-650 specimens. Therefore we argue that the major difference in the lithium storage capacity is closely related to the total nitrogen content of the carbons as well as the variation in the functionalities. The existence of N functionalities makes the neighboring carbons more electro-negative and therefore more Li-ion can adsorb/intercalate in these areas. For example, the 2$^{nd}$ cycle reversible discharge capacities of MPEw-650 (9.3% N), MPEw-750, (6.3% N) and MPEw-850 (5.6% N) are 1,780, 1,389 and 1,210 mAh g$^{-1}$, respectively. These values stabilize at 1,550, 1,050 and 920 mAh g$^{-1}$ in the 7$^{th}$-10$^{th}$ cycle. In the last 10 cycles (91-100), when charge/discharge current rolls back to 0.1 A g$^{-1}$, the three carbons show nearly constant discharge capacities of 1,365, 830 and 730 mAh g$^{-1}$, respectively.

The extremely high capacities in all three specimens—even 1,210 mAh g$^{-1}$ is still considered very favorable for any carbon—are also attributable to the large amount of hierarchical mesopores. It is known that Li-ions can adsorb on the surface of nanopores and that pores less than 1.5 nm in diameter can be fully filled. However, recent published findings show that large nanopores can accommodate more Li than surface adsorption alone, indicating some metallic Li is accumulated within the pore. In either case, the Li is weakly bound and resulting in a discharge plateau close to 0 V, agreeing well with our experimental observation (FIG. 6B).

The cycle life of MPEw is further investigated by charging/discharging for 100 cycles at 0.5 A g$^{-1}$ (FIG. 7D). The capacities at the 100$^{th}$ cycle are about 68-70% of the initial reversible capacities. The excellent cycle life can be attributed to the fact that the N-functionalities in carbons derived from biomass are incorporated into the carbon framework.

Figure 3:
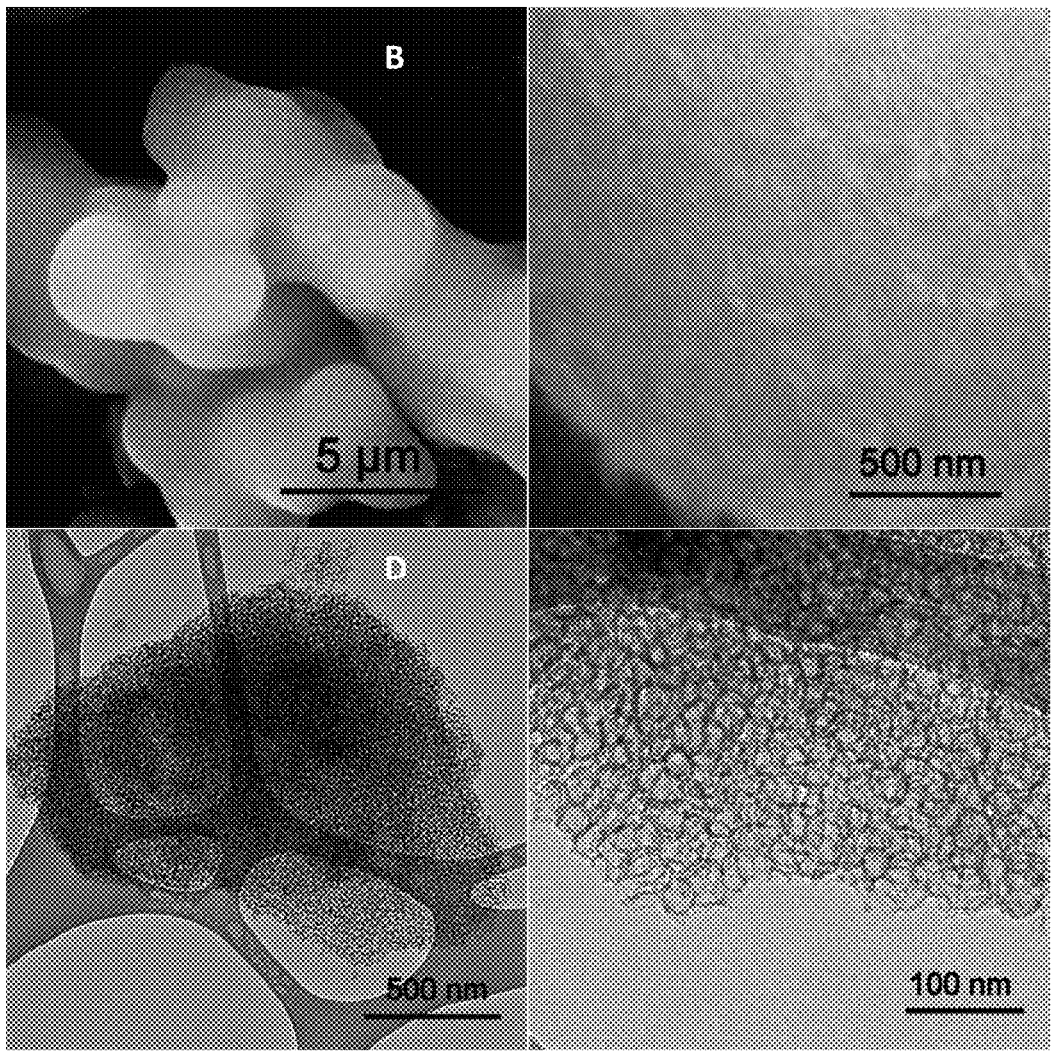
FIG. 3 shows (A,B) SEM micrographs and (C, D) TEM micrographs of the mesoporous cellular foam silica template used for the template for the egg white.

The N-functionalities and hierarchical porous structure of MPEw are valuable for supercapacitors applications as well. FIG. 3 shows the electrochemical performance of MPEw carbons in a three-electrode supercapacitor setup, tested in 1M $H_2SO_4$ electrolyte. FIG. 3A are the CV curves at 20 mV/s, while FIG. 3B shows the current density dependence of the specific capacitance. MPEw-650 demonstrates the most developed redox humps, and has the highest specific capacitance (390.4 F $g^{-1}$ at 0.25 A $g^{-1}$). The surface area normalized capacitances of MPEw-650, MPEw-750, and MPEw-850 are 48.5, 38. and 29.1 $\mu$F $cm^{-2}$ respectively, much higher than the theoretical EDLC capacitance of carbon (10-25 $\mu$F $cm^{-2}$). Therefore there is a major pseudocapacitive contribution of the surface functionalities in addition to the always-present EDLC. Even at 30 A $g^{-1}$, MPEw-650, MPEw-750, and MPEw-850 still maintain specific capacitances of 265.3 F $g^{-1}$, 186.3 F $g^{-1}$ and 162.8 F $g^{-1}$, respectively. This is attributable to the mesoporous structure of the carbons that facilitate rapid electrolyte transfer and the relatively high degree of graphitization that imparts good electrical conductivity to the electrode. All MPEw carbons show excellent cycle life with less than 7% capacitance loss after 10,000 cycles.

In summary, we employed egg whites as a model system to demonstrate that the biomass proteins that are not useful for biofuels are in fact an ideal precursor for producing N-rich carbons for high performance battery and supercapacitor electrodes. We increase the surface area, achieved here by pyrolysis, while generating an appropriate pore size distribution, achieved here with a mesoporous or microporous template, but without sacrificing the intrinsically high nitrogen content of the precursor, by limiting the pyrolysis to prevent removal of nitrogen. To derive carbons from biomass with both a high N-content and a high specific surface area is known to be a significant challenge. Even by using high N-content precursors, the carbons obtained by direct pyrolysis normally possess relatively low specific surface areas [L. Zhao, L. Z. Fan, M. Q. Zhou, H. Guan, S. Y. Qiao, M. Antonietti, M. M. Titirici, *Adv. Mater.* 2010, 22, 5202; L. Zhao, N. Baccile, S. Gross, Y. J. Zhang, W. Wei, Y. H. Sun, M. Antonietti, M. M. Titirici, *Carbon* 2010, 48, 3778]. Further chemical activations will increase the surface area, but will also significantly decrease the N-content [L. Zhao, L. Z. Fan, M. Q. Zhou, H. Guan, S. Y. Qiao, M. Antonietti, M. M. Titirici, *Adv. Mater.* 2010, 22, 5202]. As a balance, the achieved specific surface area of carbons containing more than 6% N is normally less than 250 $m^2$ $g^{-1}$ [L. Zhao, L. Z. Fan, M. Q. Zhou, H. Guan, S. Y. Qiao, M. Antonietti, M. M. Titirici, Adv. Mater. 2010, 22, 5202; E. Raymundo-Pinero, M. Cadek, F. Beguin, Adv. Funct. Mater. 2009, 19, 1032; L. Zhao, N. Baccile, S. Gross, Y. J. Zhang, W. Wei, Y. H. Sun, M. Antonietti, M. M. Titirici, *Carbon* 2010, 48, 3778]. In this work, we templated a MCF structure with proteins to obtain carbons rich in nitrogen (as high as 9.3% N) and yet with a high specific surface area (805.7 $m^2$ $g^{-1}$), a favorable pore size distribution, and a sufficient degree of graphitization. This material exhibits the highest reported reversible capacity of any carbon-based LIB anode (1,780 mAh $g^{-1}$), and among the highest reported specific capacitances for any carbon-based electrochemical capacitor electrode (390.4 F $g^{-1}$).

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method of forming a capacitive material comprising pyrolyzing eggshell membrane and partially activating carbon in the eggshell membrane to yield a partially-activated eggshell membrane having a continuous conducting core and a porous shell, the porous shell comprising at least 6.5 wt % nitrogen.

2. The method of claim 1 further comprising functionalizing the pyrolyzed eggshell membrane.

3. The method of claim 1 in which, after pyrolysis, the porous shell comprises oxygen.

4. A method of forming a carbon material, comprising:
    adsorbing egg white proteins onto a porous template; and
    pyrolyzing the egg white proteins on the porous template to form activated carbon, the activated carbon containing at least 6.5 wt % of nitrogen.

5. The method of claim 4 in which the porous template is mesoporous.

6. The method of claim 4 further comprising removing the porous template after pyrolyzing.

7. The method of claim 4 further comprising functionalizing the activated carbon.

8. The method of claim 4 in which the activated carbon contains at least 6.5 wt % to 9.3 wt % or less of nitrogen.

9. The method of claim 4 in which the activated carbon contains at least 3 wt % of oxygen.

10. A method of forming a capacitive material comprising pyrolyzing eggshell membrane and partially activating carbon in the eggshell membrane to yield a partially-activated eggshell membrane having a continuous conducting core and a porous shell, in which the partially-activated eggshell membrane contains at least 8 wt % of nitrogen.

11. The method of claim 10 in which the activated carbon contains at least 8 wt % to 15 wt % or less of nitrogen.

12. The method of claim 10, in which the partially-activated eggshell membrane contains at least 9 wt % of oxygen.

13. A method of forming a capacitive material comprising pyrolyzing eggshell membrane and partially activating carbon in the eggshell membrane to yield a partially-activated eggshell membrane having a continuous conducting core and a porous shell, wherein the porous shell contains either only micropores having pore sizes less than 2 nm or only mesopores having pore sizes of 2-50 nm.

14. The method of claim 4, wherein the activated carbon contains either only micropores having pore sizes less than 2 nm or only mesopores having pore sizes of 2-50 nm.

15. The method of claim 4, wherein the activated carbon includes a solid core and a porous outer region.

16. The method of claim 10, wherein the core is solid.

* * * * *